US009355604B2

(12) United States Patent
Chang

(10) Patent No.: US 9,355,604 B2
(45) Date of Patent: May 31, 2016

(54) OVERDRIVING CONTROL METHOD WITH IMAGE COMPRESSION CONTROL AND RELATED CIRCUIT

(71) Applicant: Realtek Semiconductor Corp., HsinChu (TW)

(72) Inventor: Cheng-Hsin Chang, Hsinchu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 213 days.

(21) Appl. No.: 14/149,834

(22) Filed: Jan. 8, 2014

(65) Prior Publication Data

US 2014/0192032 A1 Jul. 10, 2014

(30) Foreign Application Priority Data

Jan. 9, 2013 (TW) ............................. 102100723 A

(51) Int. Cl.
*G06T 1/60* (2006.01)
*G09G 3/36* (2006.01)

(52) U.S. Cl.
CPC ...... *G09G 3/3648* (2013.01); *G09G 2320/0252* (2013.01); *G09G 2320/0613* (2013.01); *G09G 2340/02* (2013.01)

(58) Field of Classification Search
CPC .............. G09G 2320/0613; G09G 2320/0252; G09G 2340/16; G09G 2320/106
See application file for complete search history.

(56) References Cited

U.S. PATENT DOCUMENTS

2005/0237316 A1* 10/2005 Huang ................. G09G 3/3648 345/204
2006/0164365 A1* 7/2006 Huang ..................... G09G 3/36 345/98
2009/0021499 A1* 1/2009 Chen .................... G09G 3/2007 345/204
2009/0109211 A1* 4/2009 Nose .................... G09G 3/3688 345/214
2009/0322713 A1* 12/2009 Furihata ............... H04N 19/186 345/204
2010/0295872 A1* 11/2010 Uchida ................ G09G 3/3611 345/660

FOREIGN PATENT DOCUMENTS

| | | | |
|---|---|---|---|
| CN | 101783130 | A | 7/2010 |
| CN | 101894531 | A | 11/2010 |
| CN | 101621614 | B | 8/2011 |
| TW | 200820210 | | 5/2008 |

* cited by examiner

*Primary Examiner* — Grant Sitta
*Assistant Examiner* — Amen Bogale
(74) *Attorney, Agent, or Firm* — Winston Hsu; Scott Margo

(57) ABSTRACT

An overdriving control method includes: receiving an input image; determining whether the input image is a moving image or a still image, and generating a determining signal; dynamically using image compression process according to the determining signal; and dynamically using overdriving process according to the determining signal. An overdriving control circuit includes a receiving unit, arranged for outputting an input image; a determining unit, arranged for generating a determining signal by determining whether the input image is a moving image or a still image; an image compression processing unit, arranged for dynamically performing image compression process upon the input image according to the determining signal, and generating an image compression processing unit output; and an overdriving processing unit, arranged for dynamically performing an overdriving process upon the image compression processing unit output according to the determining signal, and generating an overdriving processing unit output.

10 Claims, 4 Drawing Sheets

OVERDRIVING CONTROL METHOD WITH IMAGE COMPRESSION CONTROL AND RELATED CIRCUIT

BACKGROUND OF THE INVENTION

1. Field of the Invention

The disclosed embodiments of the present invention relate to overdriving control and a related circuit, and more particularly, to an overdriving control method with image compression control and a circuit thereof.

2. Description of the Prior Art

In order to save bandwidth usage of an image transmission interface, a liquid crystal display driver IC (such as a thin film transistor liquid crystal display or TFT LCD) will have a built-in memory, such as a static random access memory body (SRAM). The memory is used to temporarily hold image data which has been sent to the driver IC but has not yet been outputted. With developments in display size, resolution, frame rate and color depth, the memory built inside the driver IC needs to increase in capacity in order to cope with the increasing amount of image data transmission. The bandwidth requirements also increase proportionally. In practical applications, image compression technology is utilized to reduce the bandwidth occupied by the memory without significantly degrading display quality.

Liquid crystal molecules in an LCD display have a relatively slow response. It often takes hundreds of milliseconds to go from one value to another and back again so that the molecules can change their direction. The response time of the liquid crystal molecules needs to be less than several milliseconds (e.g. 17 ms) for avoiding perceived motion blur, hence overdrive technology is applied for providing an overshoot voltage to motivate and accelerate the liquid crystal molecules to approach a predetermined position; the voltage will then drop back to an appropriate value (the response time of liquid crystal molecules is proportional to the supply voltage). The overdrive technology is applied in conjunction with the information of the pixel content so that one liquid crystal molecule does not need to change its voltage level or direction if the color of the corresponding pixel remains unchanged; if the color of the corresponding pixel changes, the liquid crystal molecule only needs to move from the present value to the new value corresponding to the changed pixel.

Employing image compression for reducing bandwidth occupied by memory access may degrade the original high-definition quality of the display. Moreover, overdrive further carves up the memory bandwidth, as the more complicated the overdriving process, the more memory and memory bandwidth required. Due to the above-mentioned trade-off between memory bandwidth and quality, there is an urgent need for an innovative overdrive control method which can control image compression processing and overdrive processing.

SUMMARY OF THE INVENTION

Thus, one of the objectives of the present invention is to provide an overdriving control method and a related control circuit to solve the problem mentioned above.

According to a first embodiment of the present invention, an overdriving control method is disclosed. The overdriving control method comprises: receiving an input image; determining whether the input image is a moving image or a still image, and generating a determining signal, wherein the determining signal indicates the input image is the moving image or the still image; using an image compression process dynamically according to the determining signal; and using an overdriving process dynamically according to the determining signal.

According to a second embodiment of the present invention, an overdriving control circuit is disclosed. The overdriving control circuit comprises a receiving unit, a determining unit, an image compression processing unit, and an overdriving processing unit. The receiving unit is arranged for receiving an input image. The determining unit is coupled to the receiving unit and arranged for determining whether the input image is a moving image or a still image, and generating a determining signal, wherein the determining signal indicates the input image is the moving image or the still image. The image compression processing unit is coupled to the receiving unit and the determining unit respectively, and is arranged for performing an image compression process dynamically upon the input image according to the determining signal to generate an image compression processing unit output. The overdriving processing unit is coupled to the image compression processing unit and the determining unit, and is arranged for performing an overdriving process dynamically upon the image compression processing unit output according to the determining signal to generate an overdriving processing unit output.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
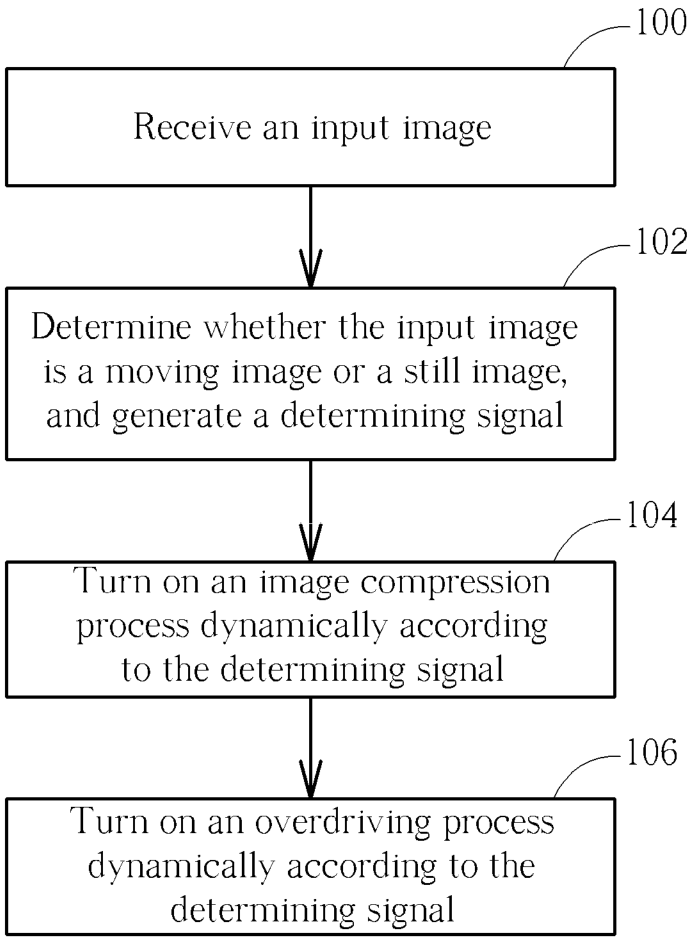
FIG. 1 is a flowchart illustrating an overdrive control method according to an exemplary embodiment of the present invention.

Please refer to FIG. 1, which is a flowchart illustrating an overdrive control method according to an exemplary embodiment of the present invention. Provided that substantially the same result is achieved, the steps of the flowchart shown in FIG. 1 need not be in the exact order shown and need not be contiguous; that is, other steps can be intermediate. Some steps in FIG. 1 may be omitted according to various embodiments or requirements. The method may be briefly summarized as follows.

Step 100: Receive an input image;

Step 102: Determine whether the input image is a moving image or a still image, and generate a determining signal;

Step 104: Use an image compression process dynamically according to the determining signal; and Step 106: Use an overdriving process dynamically according to the determining signal.

Figure 2:
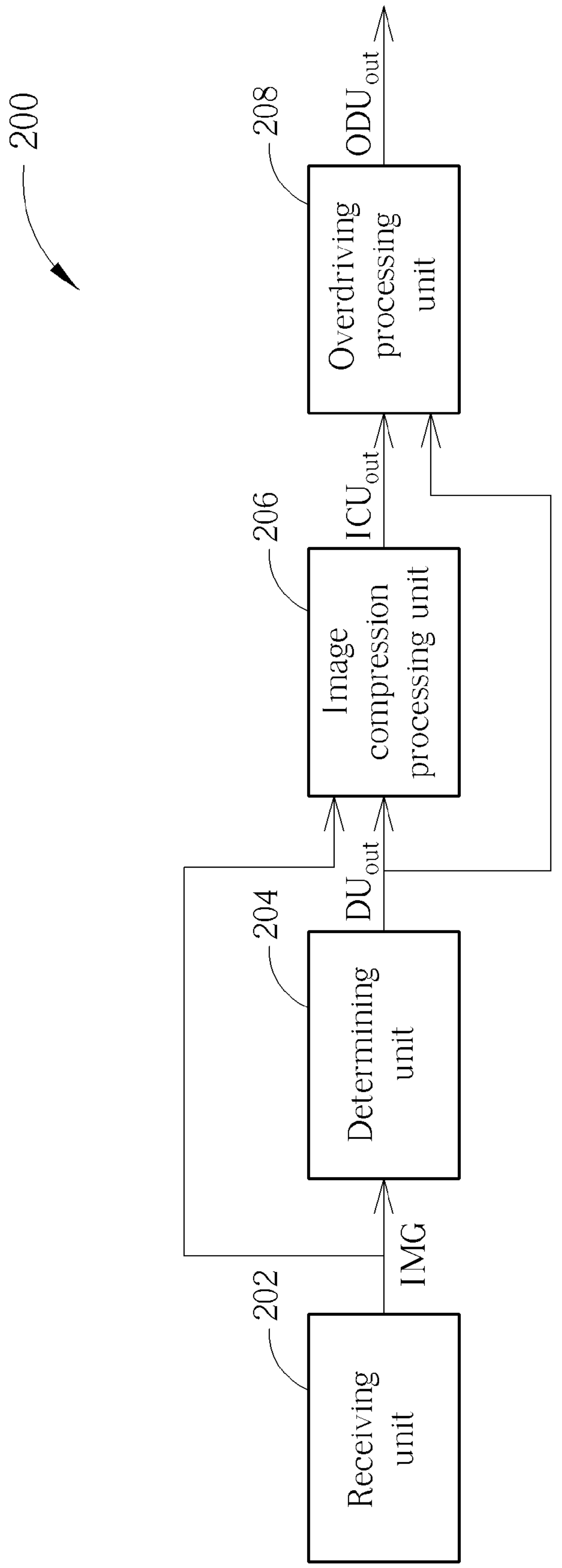
FIG. 2 is a diagram illustrating an overdrive control circuit according to an exemplary embodiment of the present invention.

Please refer to FIG. 2, which is a diagram illustrating an overdrive control circuit 200 according to an exemplary embodiment of the present invention. The overdrive control circuit 200 includes a receiving unit 202, a determining unit 204, an image compression processing unit 206, and an overdriving processing unit 208. The receiving unit is arranged for receiving an input image IMG. The determining unit 204 is arranged for determining whether the input image IMG is a moving image or a still image, and generating a determining signal $DU_{out}$. For instance, via a comparison with the preceding input image IMG, if the current input image IMG is found to be unchanged, which means the two consecutive input images are the same (or almost the same), then the determining unit 204 would determine the input image IMG to be a still image; if the difference of the two consecutive input images exceeds a certain level, then the determining unit 204 would determine the input image IMG to be a moving image. In an alternative design of the present embodiment, the determining unit 204 compares ten consecutive input images, and if the ten consecutive input images are almost the same or substantially the same, then the determining unit 204 would determine the input image IMG to be a still image; else if the ten consecutive input images are different from each other to a certain extent, then the determining unit 204 would determine the input image IMG to be a moving image. The above descriptions are for illustrative purpose only: in practice, any other determining mechanisms which are able to achieve the same or similar objective all belong to the scope of the present invention.

In the present invention, the image compression processing unit 206 is arranged for performing an image compression process dynamically upon the input image according to the determining signal $DU_{out}$. When the determining unit 204 determines the input image IMG to be the moving image and generates the determining signal $DU_{out}$ to the image compression processing unit 206, since the determining signal $DU_{out}$ indicates that the input image IMG is the moving image, the image compression processing unit 206 would perform the image compression process upon the input image IMG to generate an image compression processing unit output $ICU_{out}$ (which is a compressed image). It should be noted that the lossy compression of a still image would be more easily perceived by the viewer; the lossy compression of a moving image, however, would not be easily perceived by the viewer due to the dynamic screen (changing characters or background). In this embodiment, the image compression processing unit 206 may perform a lossy image compression process upon the input image IMG; accordingly, in order to achieve the purpose of reducing memory usage without affecting the perceived image quality, the image compression processing unit 206 is configured to perform the image compression process upon the input image IMG only if the determining unit 204 indicates that the input image IMG is a moving image, and further output a compressed image as the image compression processing unit output $ICU_{out}$. If the determining signal $DU_{out}$ indicates that the output image IMG is a still image, the image compression processing unit 206 will not perform image compression upon the output image IMG; instead, the input image IMG (which is not compressed) is directly output as the image compression processing unit output $ICU_{out}$.

In this embodiment, the overdriving processing unit 208 is coupled to the image compression processing unit 206 and the determining unit 204 respectively. When the determining unit 204 determines the input image IMG to be a moving image and outputs the determining signal $DU_{out}$ to the overdriving processing unit 208, the overdriving processing unit 208 will perform an overdriving process upon the image compression processing unit output $ICU_{out}$ (the compressed image in this case) to generate an overdriving processing unit output $ODU_{out}$ (the overdriven output). It should be noted that, in practice, the liquid crystal molecules do not change their status dramatically in the case of a still image so that the viewer does not perceive motion blur even without the overdriving process. Motion blur is more easily perceived in the case of the moving image since the characters or background may change dramatically, causing the liquid crystal molecules to change their status rapidly. In the present embodiment, in order to achieve the objective of saving memory bandwidth while reducing the motion blur as much as possible, the overdriving processing unit 208 performs the overdriving process upon the image compression processing unit output $ICU_{out}$ and generates the overdriving processing unit output $ODU_{out}$ only when the determining unit 204 determines the input image IMG to be the moving image. If the determining signal $DU_{out}$ indicates that the input image is the still image, the overdriving processing unit 208 will not perform the overdriving process upon the image compression processing unit $ICU_{out}$ (which is uncompressed), but directly outputs the un-overdriven image compression processing unit output $ICU_{out}$ as the overdriving processing unit output $ODU_{out}$.

Figure 3:
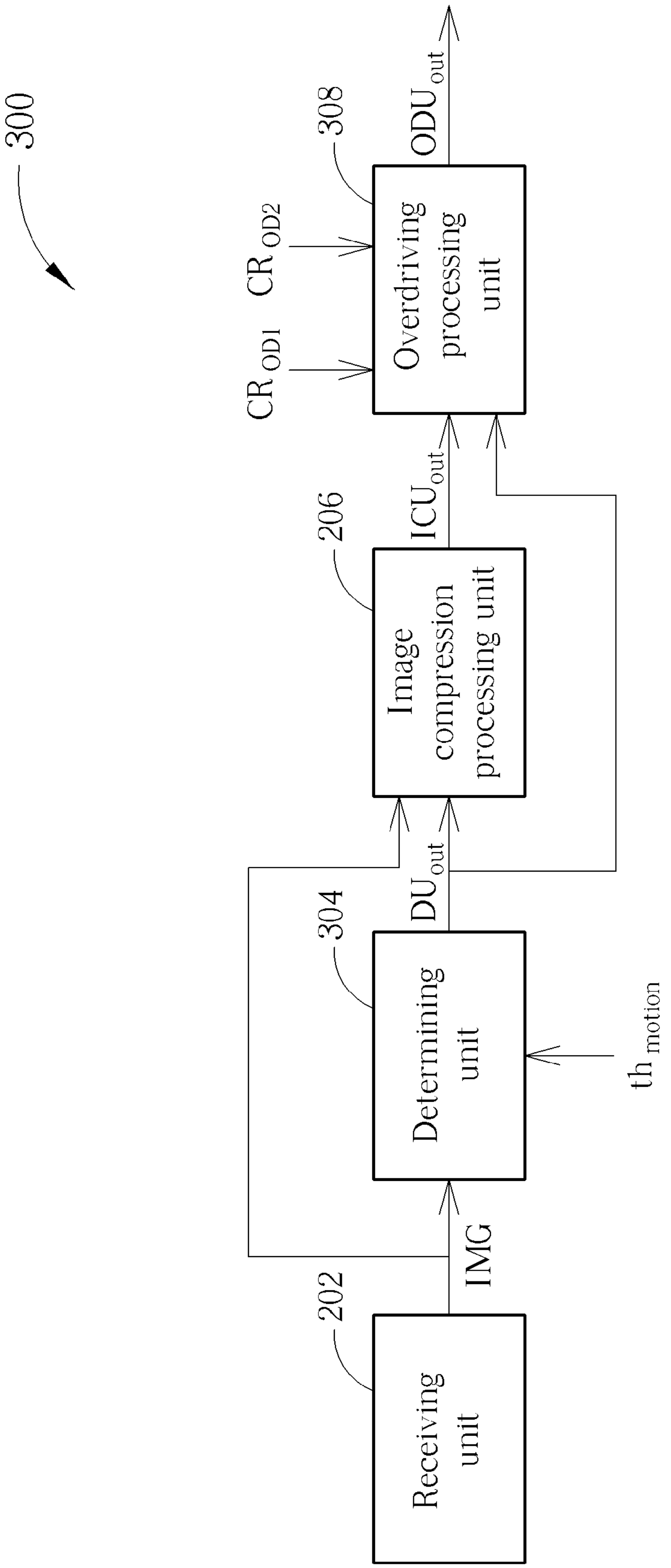
FIG. 3 is a diagram illustrating the overdriving control circuit according to another exemplary embodiment of the present invention.

Please refer to FIG. 3, which is a diagram illustrating the overdriving control circuit 300 according to another exemplary embodiment of the present invention. The overdriving control circuit 300 includes the receiving unit 202 mentioned above, a determining unit 304, the image compression processing unit 206, and an overdriving processing unit 308. The determining unit 304 is utilized for determining whether the input image IMG is a moving image or a still image according to a predetermined threshold $th_{motion}$ and then generating a determining signal $DU_{out}$. Specifically, if the input image IMG has motion and the motion is less than the predetermined threshold $th_{motion}$, the input image IMG is determined to be the still image. If the input image IMG has motion and the motion is not less than the predetermined threshold $th_{motion}$, the input image IMG is determined to be the moving image. The motion determination may be obtained through utilizing algorithms related to conventional motion detection techniques, such as a frame difference algorithm or a global motion detection algorithm. This is only for illustrative purpose: any other determining mechanisms which are able to achieve the same or similar objective all belong to the scope of the present invention. Although determining the input image IMG to be the moving image or the still image in accordance with the predetermined threshold $th_{motion}$ is relatively complicated, this technique allows the following circuits to operate in a more flexible and effective manner, thereby reaching out a balance point between the best image quality for the viewer, and memory bandwidth.

In this embodiment, the overdriving processing unit 308 is coupled to the image compression processing unit 206 and the determining unit 304 respectively. If the determining unit 304 determines that the input image IMG is a moving image and outputs the determining signal $DU_{out}$ to the overdriving processing unit 308, since the determining signal $DU_{out}$ indicates that the input image IMG is the moving image, the overdriving processing unit 308 performs an overdriving process with a compression rate $CR_{OD1}$ upon the image compression processing unit output $ICU_{out}$ to generate an overdriving processing unit output $ODU_{out}$ (corresponding to the overdriven output with the compression rate $CR_{OD1}$). In addition, since the liquid crystal molecules do not change their status dramatically in the case of the still image, if the determining signal $DU_{out}$ indicates that the input image IMG is the still image, the overdriving processing unit 308 performs an overdriving process with a compression rate $CR_{OD2}$ upon the image compression processing unit output $ICU_{out}$ (which is uncompressed) to generate an overdriving processing unit output $ODU_{out}$ corresponding to the overdriven output with the compression rate $CR_{OD2}$, wherein the compression rate $CR_{OD1}$ is greater than the compression rate $CR_{OD2}$. To put it another way, the overdriving processing unit 308 is configured to perform a more accurate overdriving process when dealing with the moving image. As there will be no apparent difference between a complicated overdriving process or a simple overdriving process when dealing with the still image, employing a rough overdriving process is possible in this case, i.e., applying another compression rate $CR_{OD2}$ which is less than the compression rate $CR_{OD1}$ for the data compression of the overdriving process. The data may be the information of a pixel.

Figure 4:
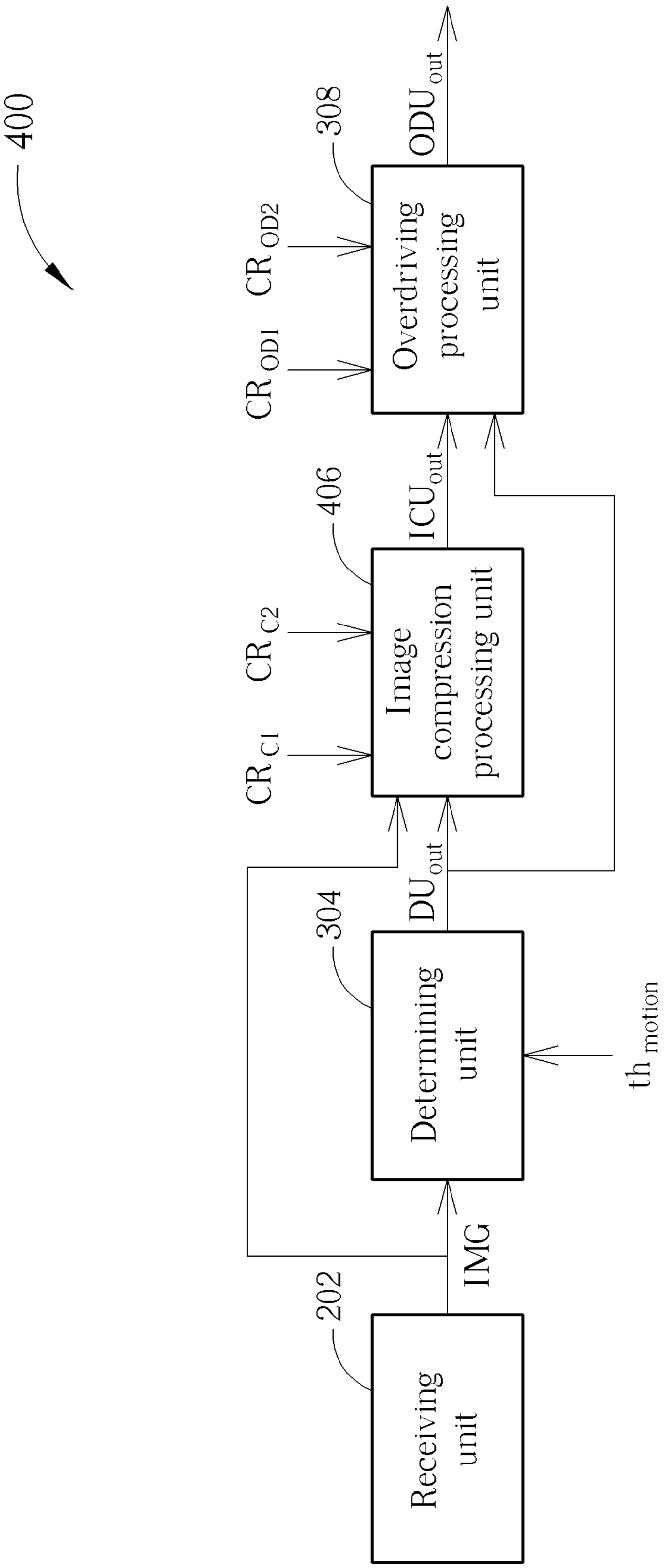
FIG. 4 is a diagram illustrating the overdriving control circuit according to another exemplary embodiment of the present invention.

Please refer to FIG. 4, which is a diagram illustrating the overdriving control circuit 400 according to another exemplary embodiment of the present invention. The overdriving control circuit 400 includes the receiving unit 202 mentioned above, the determining unit 304 mentioned above, an image compression processing unit 406, and the overdriving processing unit 308 mentioned above. In this embodiment, the image compression processing unit 406 is utilized for performing an image compression process dynamically upon the input image IMG according to the determining signal $DU_{out}$; specifically, if the determining unit 304 determines that the input image IMG is a moving image and outputs the determining signal $DU_{out}$ to the image compression processing unit 406, since the determining signal $DU_{out}$ indicates that the input image IMG is the moving image, the image compression processing unit 406 performs an image compression process with a compression rate $CR_{C1}$ upon the input image IMG to generate a first compressed image output as the image compression processing unit output $ICU_{out}$. If, however, the determining unit 304 determines that the input image IMG is a still image and outputs the determining signal $DU_{out}$ to the image compression processing unit 406, since the determining signal $DU_{out}$ indicates that the input image IMG is the still image, the image compression processing unit 406 performs the image compression process with a compression rate $CR_{C2}$ upon the input image IMG to generate a second compressed image output as the image compression processing unit output $ICU_{out}$, wherein the compression rate $CR_{C1}$ is less than the compression rate $CR_{C2}$. The image compression processing unit 406 is configured to perform the lossy image compression process with a higher distortion rate while dealing with the moving image, but performs the lossy image compression process with a lower distortion rate when dealing with a still image, i.e. applying another compression rate $CR_{C2}$ higher than the compression rate $CR_{C1}$ for the image compression process.

In this embodiment, similar to the overdriving control circuit 300, when the determining unit 304 determines that the input image IMG is a moving image and generates the determining signal $DU_{out}$ to the overdriving processing unit 308, the overdriving processing unit 308 performs the overdriving process with the compression rate $CR_{OD1}$ upon the image compression process unit output $ICU_{out}$ to generate the overdriving processing unit output $ODU_{out}$. When the determining unit 304 determines that the input image IMG is a still image and generates the determining signal $DU_{out}$ to the overdriving processing unit 308, the overdriving processing unit 308 performs the overdriving process with the compression rate $CR_{OD2}$ upon the image compression process unit output $ICU_{out}$ to generate the overdriving processing unit output $ODU_{out}$. It should be noted that, when the image compression process and the overdriving process both need to be utilized at the same time according to the determining signal $DU_{out}$, there may be a time difference between the switching of the two processes. The overdriving process should not be utilized earlier than the image compression process, so the image compression process and the overdriving process should be utilized in sequence (i.e. the image compression processing unit 406 first, and then the overdriving processing unit 308), else a bandwidth peak may be induced or the bandwidth may be exceeded. When the image compression process and the overdriving process both do not need to be utilized at the same time according to the determining signal $DU_{out}$, there may be a time difference between the utilization of the two processes. The image compression process should not be turned off earlier than the overdriving process, so the overdriving process and the image compression process should be turned off in sequence (i.e. the overdriving processing unit 308 first, and then the image compression processing unit 406), else a bandwidth peak may be induced or the bandwidth may be exceeded.

The disclosed embodiments of the present invention perform the image compression process and the overdriving process dynamically by determining whether the input image is a moving image or a still image. Bandwidth usage becomes more flexible and more effective, such that the image quality of the still image and the moving image are respectively upgraded without adding extra memory usage in the LCD driver IC.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An overdriving control method, comprising:

receiving an input image;

determining whether the input image is a moving image or a still image and generating a determining signal, wherein the determining signal indicates the input image is the moving image or the still image;

using an image compression process dynamically according to the determining signal; and using an overdriving process dynamically according to the determining signal;

wherein the step of step of using the image compression process dynamically according to the determining signal comprises:

according to the determining signal, when the input image is the moving image, performing the image compression process upon the input image to generate a compressed image; and according to the determining signal, when the input image is the still image, not performing the image compression process upon the input image;

wherein the step of using the overdriving process dynamically according to the determining signal comprises:

according to the determining signal, when the input image is the moving image, performing the overdriving process with a first compression rate upon the compressed image; and according to the determining signal, when the input image is the still image, performing the overdriving process with a second compression rate upon the input image;

wherein the first compression rate is greater than the second compression rate.

2. The overdriving control method of claim 1, wherein the step of determining whether the input image is a moving image or a still image comprises:

when the input image is considered still, determining the input image as the still image; and when the input image is not considered still, determining the input image as the moving image.

3. The overdriving control method of claim 1, wherein the step of determining whether the input image is a moving image or a still image comprises:

when the input image has an associated motion which is less than a predetermined threshold, determining the input image as the still image; and when the input image has an associated motion which is not less than a predetermined threshold, determining the input image as the moving image.

4. The overdriving control method of claim 1, wherein according to the determining signal, when the image compression process and the overdriving process both need to be turned on from the off state, the image compression process and the overdriving process are turned on sequentially.

5. The overdriving control method of claim 1, wherein according to the determining signal, when the image compression process and the overdriving process both need to be turned off from the on state, the overdriving process and the image compression process are turned off sequentially.

6. An overdriving control circuit, comprising:

a receiving unit, arranged for receiving an input image;

a determining unit, coupled to the receiving unit, arranged for determining whether the input image is a moving image or a still image and generating a determining signal, wherein the determining signal indicates the input image is the moving image or the still image;

an image compression processing unit, coupled to the receiving unit and the determining unit respectively, arranged for performing an image compression process dynamically upon the input image according to the determining signal to generate an image compression processing unit output; and an overdriving processing unit, coupled to the image compression processing unit and the determining unit, arranged for performing an overdriving process dynamically upon the image compression processing unit output according to the determining signal to generate an overdriving processing unit output;

wherein according to the determining signal, when the input image is the moving image, the image compression processing unit performs the image compression process upon the input image to generate a compressed image, and outputs the compressed image as the image compression processing unit output and according to the determining signal, when the input image is the still image, the image compression processing unit does not perform the image compression process upon the input image, and directly outputs the input image as the image compression processing unit output;

wherein according to the determining signal, when the input image is the moving image, the overdriving processing unit performs the overdriving process with a first compression rate upon the compressed image; and according to the determining signal, when the input image is the still image, the overdriving processing unit performs the overdriving process with a second compression rate upon the input image, wherein the first compression rate is greater than the second compression rate.

7. The overdriving control circuit of claim 6, wherein when the input image is considered still, the determining unit determines the input image as the still image; and when the input image is not considered still, the determining unit determines the input image as the moving image.

8. The overdriving control circuit of claim 6, wherein when the input image has a motion which is less than a predetermined threshold, the determining unit determines the input image as the still image; and when the input image has a motion which is not less than a predetermined threshold, the determining unit determines the input image as the moving image.

9. The overdriving control circuit of claim 6, wherein according to the determining signal, when the image compression process and the overdriving process both need to be turned on from the off state, the image compression process and the overdriving process are turned on sequentially.

10. The overdriving control circuit of claim 6, wherein according to the determining signal, when the image compression process and the overdriving process both need to be turned off from the on state, the overdriving process and the image compression process are turned off sequentially.

* * * * *